June 13, 1944.  R. G. HOLT  2,351,512
NONCHATTERING RELIEF VALVE
Filed July 3, 1942
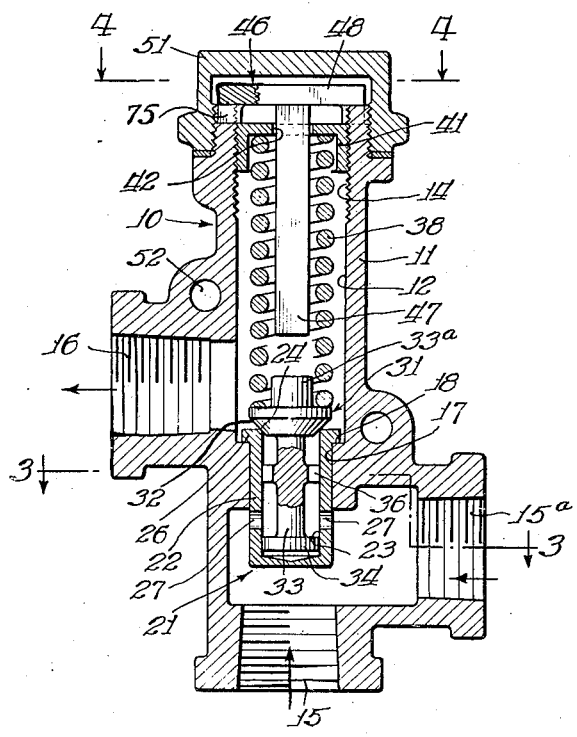
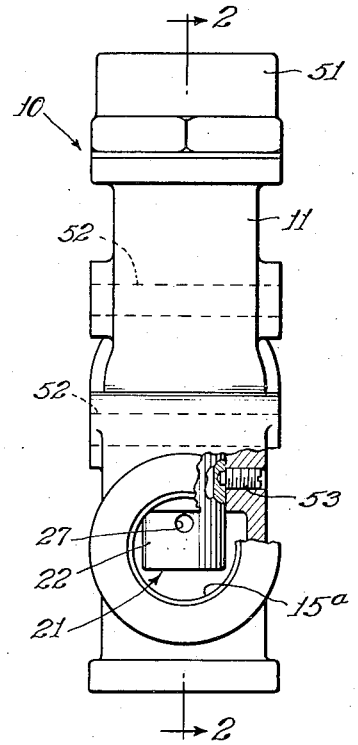
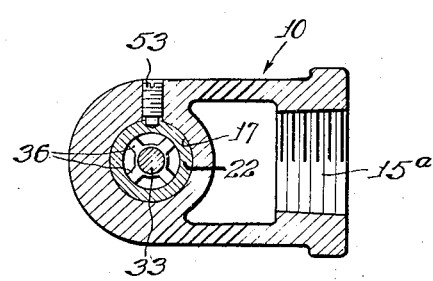
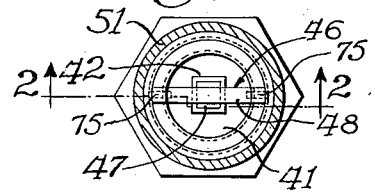
Inventor:
Ray G. Holt
By: Edward C. Gritzbaugh
Atty.

Patented June 13, 1944

2,351,512

UNITED STATES PATENT OFFICE 2,351,512

NONCHATTERING RELIEF VALVE

Ray G. Holt, Euclid, Ohio, assignor to Pesco Products Co., a corporation of Ohio Application July 3, 1942, Serial No. 449,579

3 Claims. (Cl. 137—53)

This invention relates to valve assemblies and particularly to a relief valve assembly provided with a special arrangement for preventing the inadvertent movement of the valve or the condition which is known in the trade as "chattering."

It is an object to provide a construction that is relatively inexpensive to manufacture and particularly inexpensive to service, but which arrangement is highly efficient and satisfactory in operation. It is a more specific object to provide an improved arrangement of the above type including a dash pot and piston for preventing the vibration of chattering that normally results from surges or transient changes in the pressures acting thereon.

Other and more particular objects, advantages and uses of my invention will become apparent from a reading of the following specification taken in connection with the accompanying drawing which forms a part thereof and wherein:

Fig. 1 is an elevation view of a relief valve incorporating a preferred embodiment of my invention;

Fig. 2 is a cross section view taken substantially on the line 2—2 of Fig. 1 and showing to advantage the arrangement of readily replaceable combination valve seat and, dash pot cylinder as well as the combination valve and piston cooperating therewith;

Fig. 3 is a cross section view taken substantially on the line 3—3 of Fig. 2; and Fig. 4 is a cross sectional view taken substantially on the line 4—4 of Figure 2 looking in the direction of the arrows.

Referring in greater detail to the figures of the drawing, 10 indicates generally a relief valve assembly incorporating a preferred embodiment of my invention and wherein an elongated generally tubular cross section housing 11 is formed with a coaxial bore 12 therein. This bore may extend all the way through the housing 11 from one extremity to the other providing a first open end 14 for the introduction of a valve mechanism as will appear and a second extremity which is preferably threaded to provide an inlet passage 15 adapted for connection with a source of pressure. There may also be provided any number of additional inlet passages communicating with the main bore 12, only one being shown and designated as 15a. An outlet passage 16 is formed in housing 11 in communication with main bore 12 at a position removed along the general axis of bore 12 from the position of communication with said main bore of inlet passages 15 and 15a.

Main bore 12 is formed with a restricted portion 17 between the area of communication with main bore 12 and the inlet ports and outlet port, this restriction also providing a shoulder 18. Forming a particular part of the present invention is the provision of a separate combination valve seat and dash pot cylinder indicated generally at 21 and insertable through the open end 14 of main bore 12 and into engagement with restricted bore 17 and shoulder 18. This combination valve seat and dash pot cylinder preferably comprises a tubular member 22 closed at one end thereof to form a dash pot cylinder 23 and open at the other end thereof to form a valve seat 24. Extending radially about the open end portion of sleeve 22 is an annular flange 26 functioning to engage shoulder 18 to determine the position of sleeve 22 within the restricted passage 17 allowing the dash pot portion 23 to extend beyond the restricted portion 17 and expose radial inlet ports 27 for the purpose of admitting liquid from the inlet port or ports in sleeve 22.

A valve assembly indicated generally at 31 comprises a valve 32 receivable in engagement with seat 24 and having a depending stem portion 33 of a cross section less than the cross sectional area of the inner periphery of sleeve 22, this stem terminating in a piston 34 cooperating with cylinder 23 to form a dash pot functioning to prevent the inadvertent vibration or chattering of valve 32. This stem 33 is formed intermediate the ends thereof with radially extending spoke-like elements 36 spaced apart circumferentially to allow the free passage of liquid thereby and functioning to maintain the piston in alignment with the cylinder and the valve in alignment with the seat throughout the coaxial reciprocation thereof.

For the purpose of urging valve 32 in the direction of engagement with seat 24 with a predetermined pressure as determined by the pressure at which it is desired to effect relief, there is provided a spring 38 one terminal portion of which engages the upper side of valve 32 about a second coaxially extending stem portion 33a the opposite end of which spring is engaged by an adjusting nut 41 externally threaded for cooperation with a complementary thread within the terminal portion 14 of bore 12 and formed centrally with a non-circular opening 42. A combination valve stop, adjusting nut operator and lock indicated generally at 46 includes a depending non-circular stop pin 47 extending through and cooperating with non-circular opening 42 and functioning to limit the extent of movement of valve 32 away from seat 24. A bar 48 extends radially from the upper end of pin 47 and serves both to provide the necessary turning moment for adjusting nut 41 and the terminal portions thereof also cooperate with complementarily formed slots in the terminal portion of housing 11 to prevent inadvertent turning of nut 41 during operation of the valve. A bonnet or cap 51 is internally threaded for cooperation with external threads on the terminal portion of housing 11 and embraces the end thereof to maintain the valve stop and lock nut assembly in adjusted position. It will be apparent that any desired compression of spring 38 may be effected merely by removing bonnet 51, lifting bar 48 axially and turning the same to effect the necessary positioning of lock nut 41. As will be apparent from examination of Figs. 2 and 4, a slot 75 on each side of the housing 11 is provided to receive the depending ends of bar 48.

For the purpose of attaching the valve assembly 10 to the structure which is to carry the same holes 52 may be provided in housing 11 for the reception of fastening bolts (not shown). Valve seat and dash pot cylinder assembly 21 is preferably fixed in position within restricted bore 17 by means of a lock screw 53 passing through the wall of housing 11.

It will thus appear from the above that I have provided a novel and compact arrangement of elements forming a relief valve assembly wherein the combination valve seat and dash pot cylinder as well as the valve associated therewith may be readily removed for repair or replacement as well as providing for the more accurate fabrication of these parts, which can be done more readily when the parts are formed separately than when the same are an integral part of the valve housing.

In the operation of the device, fluid under pressure from the inlet passages 15 and 15a, passes through the inlet ports 27 into the dash pot cylinder. The pressure of the fluid will be asserted on the area of the valve 32, exposed to the inside of the dash pot cylinder, and the valve 32 will thus be subjected to a lifting force in an amount determined by the pressure of the fluid and the area exposed thereto; the fluid also exerts downward pressure on the upper face of the piston 34. The fluid under pressure is forced, in rather minute quantities, down around the sides of the piston 34, and under the piston 44, so that the valve 32 is lifted from its valve seat. Fluid then flows past the valve seat and into the outlet 16. Variations of fluid may cause a drop of pressure within the cylinder between the valve 32 and piston 44. In such event the valve ordinarily would tend to drop immediately to its seat. This would result in a fluctuating or chattering action in the event the fluid pressure varied rapidly. In this case however the fluid which has worked below the piston 44, will retard the piston from moving downward, so that it does not drop rapidly, but only moves down comparatively slowly as the fluid under the piston flows back up around the sides of the piston and thus allows the piston to seat gradually. It is thus seen that the piston rises comparatively slowly and drops comparatively slowly so that sudden vibrations are not reflected in the valve, and do not cause the valve to "chatter."

It is to be understood that the structure above described is presented by way of example rather than by way of limitation and that equivalent arrangements come within the intended scope of the present invention which is to be defined by the appended claims which should be given a scope commensurate with the prior art.

I claim:

1. In a relief valve arrangement, means defining an elongated generally tubular housing forming a main bore for said relief valve, a first terminal portion of said main bore forming an inlet to said main bore, means forming an outlet from said main bore communicating therewith at a position spaced therealong from the terminal portions thereof, said main bore having a reduced portion between the area of communication with said outlet passage and said inlet portion, means defining a separate combination valve seat and dash pot cylinder insertable within said main bore through said other terminal portion thereof and receivable in engagement with the reduced portion of said main bore, said separate combination valve seat and dash pot cylinder comprising a tubular sleeve closed at a first end portion thereof to define a dash pot cylinder, and open at the other end portion thereof to define a valve seat, means defining a valve assembly including a valve receivable in engagement with said valve seat and a protuberant stem portion terminating in a piston cooperating with said dash pot cylinder, said sleeve being formed with radial ports through the wall thereof between said dash pot cylinder and said valve seat, adjustable means for closing said other terminal portion of said main bore and spring means interposed between said closing means and said valve assembly for urging said valve in the direction of said seat, said closing means comprising an externally threaded adjusting nut receivable within complementary threads formed within said other terminal portion of said main bore for engaging one end of said spring, a valve stop and adjustable nut locking assembly including a depending non-circular portion receivable through a complementarily formed non-circular portion of said adjusting nut and extending coaxially of said bore to within a predetermined distance of said valve assembly and functioning to limit the movement of said valve from said seat, said valve stop and adjusting nut lock further including a radially extending bar portion, at the adjacent terminal portion of said main bore, the adjacent portion of the housing being formed with co-axially extending recesses for the reception of the extremities of said bar portion and an internally threaded bonnet receivable about the said adjacent portion of the housing in cooperation with externally formed threads on the said adjacent portion of the housing.

2. The structure defined in claim 1 wherein there is means defining at least one additional inlet passage communicating with said main bore whereby said relief valve assembly may be made to serve a plurality of separate sources of pressure requiring relief in response to the occurrence of a predetermined pressure.

3. The structure as defined in claim 1 wherein said combination valve seat and dash pot cylinder is further characterized by the formation about the periphery thereof adjacent said open end of an annular flange, said flange being effective to engage a portion of said main bore to define the normal position of said combination valve seat and dash pot cylinder within said main bore.

RAY G. HOLT.